United States Patent
McClellan et al.

(10) Patent No.: US 8,350,696 B2
(45) Date of Patent: Jan. 8, 2013

(54) SYSTEM AND METHOD FOR DEFINING AREAS OF INTEREST AND MODIFYING ASSET MONITORING IN RELATION THERETO

(75) Inventors: Scott McClellan, Heber City, UT (US); Eric Capps, Salt Lake City, UT (US); Todd Follmer, Coto de Caza, CA (US)

(73) Assignee: Independent Witness, Incorporated, Salt Lake City, UT (US)

( * ) Notice: Subject to any disclaimer, the term of this patent is extended or adjusted under 35 U.S.C. 154(b) by 0 days.

(21) Appl. No.: 13/137,431

(22) Filed: Aug. 15, 2011

(65) Prior Publication Data
US 2012/0044063 A1 Feb. 23, 2012

Related U.S. Application Data

(62) Division of application No. 11/772,661, filed on Jul. 2, 2007, now Pat. No. 7,999,670.

(51) Int. Cl.
*G08B 1/08* (2006.01)
(52) U.S. Cl. .................. 340/539.13; 368/2; 377/24.2
(58) Field of Classification Search ............. 340/539.13; 701/213; 342/44; 368/2; 377/24.2
See application file for complete search history.

(56) References Cited

U.S. PATENT DOCUMENTS

| | | | |
|---|---|---|---|
| 4,497,057 A * | 1/1985 | Kato et al. ............... | 714/46 |
| 5,303,163 A | 4/1994 | Ebaugh et al. .......... | 364/550 |
| 5,586,130 A | 12/1996 | Doyle ...................... | 371/62 |
| 5,941,915 A | 8/1999 | Federle et al. .......... | 701/1 |
| 6,108,591 A | 8/2000 | Segal et al. ............. | 701/1 |
| 6,178,374 B1 | 1/2001 | Möhlenkamp et al. .. | 701/117 |
| 6,253,129 B1 | 6/2001 | Jenkins et al. .......... | 701/29 |
| 6,306,063 B1 | 10/2001 | Horgan et al. .......... | 477/108 |
| 6,339,745 B1 | 1/2002 | Novik ...................... | 701/208 |
| 6,356,836 B1 | 3/2002 | Adolph .................... | 701/208 |
| 6,405,128 B1 | 6/2002 | Bechtolsheim et al. . | 701/208 |
| 6,415,226 B1 | 7/2002 | Kozak ...................... | 701/210 |
| 6,609,063 B1 | 8/2003 | Bender et al. ........... | 701/209 |
| 6,609,064 B1 | 8/2003 | Dean ....................... | 701/213 |
| 6,611,755 B1 | 8/2003 | Coffee et al. ............ | 701/213 |

(Continued)

FOREIGN PATENT DOCUMENTS
DE 197 00 353 A1 7/1998

OTHER PUBLICATIONS

Ogle, et al.; *Accuracy of Global Positioning System for Determining Driver Performance Parameters*; Transportation Research Record 1818; Paper No. 02-1063; pp. 12-24, Unknown.

(Continued)

*Primary Examiner* — Travis Hunnings
(74) *Attorney, Agent, or Firm* — Baker Botts LLP

(57) ABSTRACT

System and method for tracking assets comprises determining if an asset is inside a geofence area, using a first set of asset monitoring parameters to monitor operation of the asset, if the asset is inside the geofence area, and using a second set of asset monitoring parameters to monitor operation of the asset, if the asset is outside the geofence area. The invention further comprises a system and method for providing one or more competitors with an asset tracking device, wherein the asset tracking device allows each competitor's location to be monitored, defining one or more geofence areas on a racetrack, and detecting when the competitors enter a designated geofence area.

13 Claims, 6 Drawing Sheets

U.S. PATENT DOCUMENTS

| | | | |
|---|---|---|---|
| 6,622,085 B1 | 9/2003 | Amita et al. | 701/208 |
| 6,631,322 B1 | 10/2003 | Arthur et al. | 701/211 |
| 6,662,141 B2 | 12/2003 | Kaub | 702/181 |
| 6,714,894 B1 | 3/2004 | Tobey et al. | 702/188 |
| 6,766,244 B2 | 7/2004 | Obata et al. | 701/207 |
| 6,845,316 B2 | 1/2005 | Yates | 701/117 |
| 6,847,871 B2 | 1/2005 | Malik et al. | 701/33 |
| 6,847,887 B1 | 1/2005 | Casino | 701/208 |
| 6,850,841 B1 | 2/2005 | Casino | 701/208 |
| 6,894,606 B2 | 5/2005 | Forbes et al. | 340/435 |
| 6,917,290 B2 * | 7/2005 | Land | 340/539.1 |
| 6,965,827 B1 | 11/2005 | Wolfson | 701/207 |
| 6,988,034 B1 | 1/2006 | Marlatt et al. | 701/200 |
| 7,054,742 B2 | 5/2006 | Khavakh et al. | 701/209 |
| 7,119,696 B2 | 10/2006 | Borugian | 340/576 |
| 7,155,321 B2 | 12/2006 | Bromley et al. | 701/29 |
| 7,197,500 B1 | 3/2007 | Israni et al. | 707/100 |
| 7,216,022 B2 | 5/2007 | Kynast et al. | 701/1 |
| 7,269,507 B2 | 9/2007 | Cayford | 701/208 |
| 7,273,172 B2 * | 9/2007 | Olsen et al. | 235/385 |
| 7,327,250 B2 * | 2/2008 | Harvey | 340/539.13 |
| 7,421,334 B2 | 9/2008 | Dahlgren et al. | 701/117 |
| 7,433,889 B1 | 10/2008 | Barton | 707/104.1 |
| 7,447,509 B2 | 11/2008 | Cossins et al. | 455/457 |
| 7,484,663 B2 * | 2/2009 | Olsen et al. | 235/385 |
| 7,499,949 B2 | 3/2009 | Barton | 707/104.1 |
| 7,565,230 B2 | 7/2009 | Gardner et al. | 701/35 |
| 7,612,668 B2 * | 11/2009 | Harvey | 340/550 |
| 7,880,642 B2 | 2/2011 | Gueziec | 340/905 |
| 7,898,388 B2 | 3/2011 | Ehrman et al. | 340/5.8 |
| 7,941,258 B1 | 5/2011 | Mittelsteadt et al. | 701/35 |
| 7,999,670 B2 * | 8/2011 | McClellan et al. | 340/539.13 |
| 2001/0018628 A1 | 8/2001 | Jenkins et al. | 701/35 |
| 2002/0024444 A1 | 2/2002 | Hiyama et al. | 340/576 |
| 2003/0151501 A1 * | 8/2003 | Teckchandani et al. | 340/426.19 |
| 2004/0210353 A1 | 10/2004 | Rice | 701/1 |
| 2004/0236474 A1 | 11/2004 | Chowdhary et al. | 701/1 |
| 2005/0137757 A1 | 6/2005 | Phelan et al. | 701/1 |
| 2006/0011721 A1 * | 1/2006 | Olsen et al. | 235/385 |
| 2006/0238340 A1 * | 10/2006 | Harvey | 340/550 |
| 2007/0176771 A1 * | 8/2007 | Doyle | 340/539.13 |
| 2010/0042940 A1 * | 2/2010 | Monday et al. | 715/764 |
| 2011/0063138 A1 * | 3/2011 | Berkobin et al. | 340/988 |
| 2011/0238300 A1 * | 9/2011 | Schenken | 701/207 |

OTHER PUBLICATIONS

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System (IVIS) Tasks on the Information Processing Demands of a Commercial Vehicle Operations (CVO) Driver*; 230 pages, 1999.

* cited by examiner

SYSTEM AND METHOD FOR DEFINING AREAS OF INTEREST AND MODIFYING ASSET MONITORING IN RELATION THERETO

CLAIM FOR PRIORITY

This application claims priority to U.S. application Ser. No. 11/772,661 filed Jul. 2, 2007, which is hereby incorporated by reference in its entirety.

TECHNICAL FIELD

The present invention relates generally to a system and method for monitoring vehicle and asset movement and, more particularly, to a system and method for defining areas and/or regions of interest for modifying asset monitoring parameters based upon location.

BACKGROUND

Geofences are used to define geographical areas so that vehicle location can be monitored with respect to those areas. A vehicle's location can be determined using a Global Positioning System (GPS) as is known. The vehicle's current location can be compared to a geofence area to determine if the vehicle is inside or outside the geofence area. A geofence is typically defined using a simple geographic shape, such as a circle, square or rectangle. For example, a circular geofence is defined by a central point and a radius is assigned to that point. All of the area within the radius around the central point is within the geofenced area. Areas having one or more irregularly shaped boundaries are not accurately represented by simple geometric shapes. There are many areas, such as neighborhoods, cities, towns, industrial parks, roads, and the like, that cannot be adequately or precisely defined using simple shapes such as circles or rectangles that are available in current geofence applications. To geofence these areas, a large geofence area that overlaps both the target area and some of the surrounding area is often used to geofence such irregularly shaped locations.

Alternatively, multiple overlapping geofence areas must be created, such as a series of overlapping circles or squares, to cover areas such as a road, highway, or a region or shape on a lake, ocean, or river with a geofence. To determine if vehicles are within the geofence area, there must be an evaluation against all of the individual geofenced areas instead of one comprehensive area. Similar to the large, overlapping geofence area discussed above, to ensure that all of the target area is covered, these smaller individual geofence areas typically overlap some locations that are not intended to be within the target geofence area. Accordingly, the accuracy of the geofence varies depending upon the shape of the target area and the available geofencing tools.

SUMMARY OF THE INVENTION

In one embodiment of the invention, a system and method for tracking assets comprises determining if an asset is inside a geofence area or zone of interest. If the asset is inside the area or zone, a first set of asset monitoring parameters is used to monitor the operation of the asset. If the asset is outside the area or zone, a second set of asset monitoring parameters is used to monitor operation of the asset. The asset may be a vehicle that is monitored using a vehicle monitoring system capable of detecting the vehicle's speed. For example, the vehicle monitoring system may use a first set of speed parameters when monitoring the vehicle, if the vehicle is inside the geofence area or zone of interest. The vehicle monitoring system may use a second set of speed parameters for monitoring the vehicle, if the vehicle is outside the geofence area or zone of interest. The first and second sets of speed parameters may be used to provide feedback to the driver upon detection of a speeding condition. The first and second sets of speed parameters may also be used to trigger messages to a supervisor, parent or other authority upon detection of a speeding condition.

The vehicle monitoring system may also or alternatively be capable of detecting acceleration forces acting on the vehicle. The vehicle monitoring system may use a first set of acceleration parameters to monitor the vehicle, if the vehicle is inside the geofence area or zone of interest; and the vehicle monitoring system may use a second set of acceleration parameters to monitor the vehicle, if the vehicle is outside the geofence area or zone of interest. The first and second sets of acceleration parameters may be used to provide feedback to the driver based upon vehicle acceleration measurements. The first and second sets of acceleration parameters may also be used to trigger messages to a supervisor, parent or other authority based upon vehicle acceleration measurements.

The zone of interest or geofence area may have any shape, such as a multi-sided shape defined by a geographic region, a circular shape defined by a radius around a selected point, a polygon, or an irregular polygon. A geofence area or zone of interest having an irregular polygon shape may be drawn by sequentially designating locations of vertices of the irregular polygon. Alternatively, the region may be established by a mathematical spline or other mathematical procedure by designating a series of points that will then define the region. In another embodiment, the area of interest or geofence may be drawn over a map and the locations of the vertices selected from points on the map.

In one embodiment of the invention, a system and method of tracking events in a race comprises providing one or more competitors with an asset tracking device. The asset tracking device allows each competitor's location to be monitored. One or more geofence areas or zones of interest are defined on a racetrack or other area. The system detects when the competitors enter a designated geofence area or zone of interest. The system and method may further detect when the competitors leave the designated area or zone. The competitors may be detected upon entering the designated area or zone without regard to whether the competitors stop in or pass through the designated area or zone. The designated area or zone may be a finish line or other section of a race track in which case the present invention may be used in an accounting function to track laps completed by competitors. The invention may be used to count a number of times each competitor enters the designated area or zone. The designated geofence area or zone of interest may be a pit area or a safety area, for example. The competitors may be motor-powered vehicles (e.g. cars, trucks, trains, planes, boats, etc), human-powered vehicles, electro-mechanical devices (e.g. robots, etc.), humans or animals.

In another embodiment, a system and method of determining if non-competitors are clear of a racetrack comprises providing one or more non-competitors with an asset tracking device. The asset tracking device allows each non-competitor's location to be monitored. One or more zones of interest or geofence areas off of the racetrack are designated. The system detects when the non-competitors are within one or more designated off-track areas or zones. The system and method may further detect when the non-competitors leave the one or more designated areas or zones and/or when the non-competitors are stopped in the one or more designated areas or zones. The designated off-track zones or areas may be a safety zone. The system and method may determine when all of the one or more non-competitors are within the designated area or zone and may indicate that the racetrack is clear of non-competitors. In this example, non-competitors may include emergency service vehicles or pace vehicles.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The present invention provides many applicable inventive concepts that can be embodied in a wide variety of specific contexts. The specific embodiments discussed are merely illustrative of specific ways to make and use the invention, and do not limit the scope of the invention.

Figure 1:
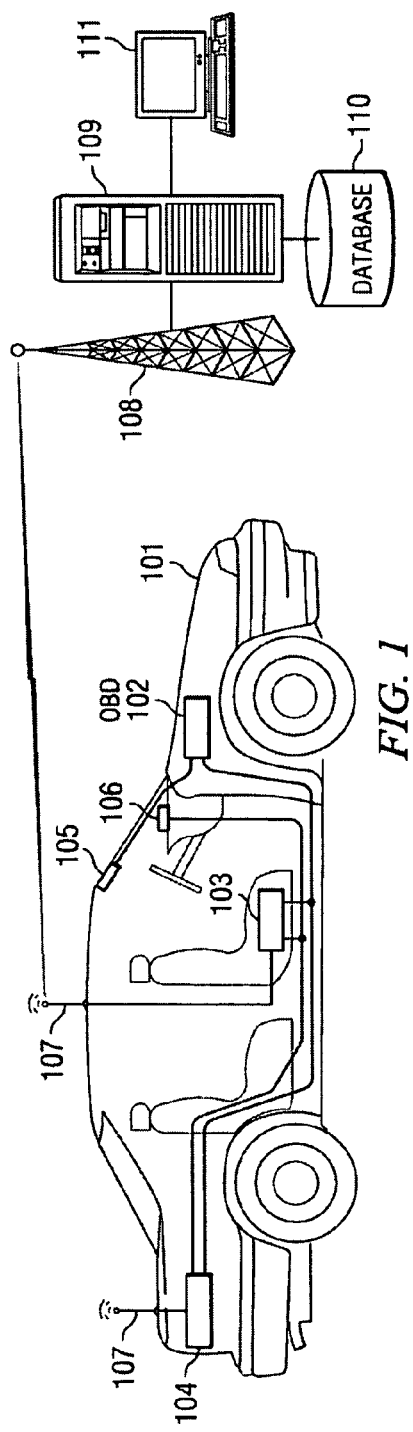
FIG. 1 is a block diagram of a system according to one embodiment of the invention.

With reference now to FIG. 1, there is shown a vehicle 101 in which a vehicle monitoring device is installed. The monitoring device may be self-contained, such as a single unit mounted on a windshield 105 or dashboard 106. Alternatively, the monitoring device may include multiple components, such as a processor or central unit mounted under a car seat 103 or in a trunk 104. Similarly, the monitoring device may have a self-contained antenna in the unit (105), or may be connected to remotely mounted antennas 107. The vehicle monitoring unit may be connected to an on-board diagnostic (OBD) system or data bus in the vehicle. Information and data associated with the operation of the vehicle may be collected from the OBD system, such as engine operating parameters, vehicle identification, seatbelt use, door position, etc. The OBD system may also be used to power the vehicle monitoring device. The vehicle monitoring system may also be coupled to other sensors or detectors that monitor engine performance and vehicle operation parameters. In one embodiment, the vehicle monitoring device is of the type described in U.S. patent application Ser. No. 11/755,556, filed on May 30, 2007, entitled "System and Method for Evaluating Driver Behavior," the disclosure of which is hereby incorporated by reference herein in its entirety.

Information may be exchanged between the vehicle monitoring system and a central monitoring system or server in real-time or at intervals. For example, the vehicle operation parameters may be transmitted to server 109 via communication network 108, which may be a cellular, satellite, WiFi, Bluetooth, infrared, ultrasound, short wave, microwave or any other suitable network. Server 109 may process the parameters and/or store the data to database 110, which may be part of server 109 or a separate device located nearby or at a remote location. Users can access the data on server 109 and database 110 using terminal 111, which may be co-located with server 109 and database 110 or coupled via the Internet or other network connection. Is some embodiments, the data captured by the monitoring system in vehicle 101 may be transmitted via a hardwired communication connection, such as an Ethernet connection that is attached to vehicle 101 when the vehicle is within a service yard or at a base station. Alternatively, the data may be transferred via a flash memory, diskette, or other memory device that can be directly connected to server 109 or terminal 111. Data, such as driving performance or warning thresholds, may also be uploaded from the central server to the vehicle monitoring device in a similar manner.

The vehicle monitoring device uses one or more sets of parameters or thresholds while monitoring the vehicle. Each set of monitoring parameters define thresholds associated with the operation of the vehicle. For example, the vehicle monitoring device receives inputs related to vehicle speed, acceleration, and location and to driver behavior, such as seatbelt use and cell phone use. The monitoring parameters define thresholds or criteria for each of these inputs, such as maximum allowed vehicle speeds or accelerations or whether the driver is required to use seatbelts. The monitoring parameters also define what action to take if one of the thresholds or criteria is exceeded. For example, if the vehicle is speeding above a speed threshold, the monitoring parameters may define that the monitoring system should warn the driver and/or notify a supervisor regarding the speeding condition.

The monitoring parameters may also define a grace period or delay in which the user can self-correct the speeding condition. For example, if the driver is passing another vehicle, the monitoring system may detect a speeding condition, but may be configured to delay warning the driver for 30 seconds or some other length of time. If the driver corrects the speeding condition, such as by returning to a posted highway speed after passing the other vehicle, the delay may prevent a warning from being sent to the driver. Other delays may be used for alerts or notices to supervisors if speeding or other threshold violations are corrected within a specified time of the violation or from when the driver is warned by an in-vehicle warning light or message.

The vehicle monitoring system may use more than one set of monitoring parameters, criteria or thresholds. For example, two sets of speeding and acceleration criteria may be used by the vehicle monitoring system to adjust the operation of the vehicle monitoring system in two different locations. One set of criteria may allow the driver to exceed speed limits by 5 MPH without warning and may set the acceleration limitations higher to allow the driver to drive more aggressively in most cities. However, if one city is known to have speed traps or to write more tickets, the vehicle monitoring system may be configured to use a different, more restrictive set of monitoring criteria in that city. Using a geofence, the boundaries of the city with speed traps may be identified to the monitoring system. When the vehicle enters that geofenced area, the monitoring system may be configured to switch to the more restrictive monitoring criteria. Using the present invention, a geofence can be established around any location and a unique set of vehicle monitoring criteria can be configured for each geofence area. Any vehicle or driver parameters that are monitored by the vehicle monitoring system may be configured specifically for a particular area.

Figure 2:
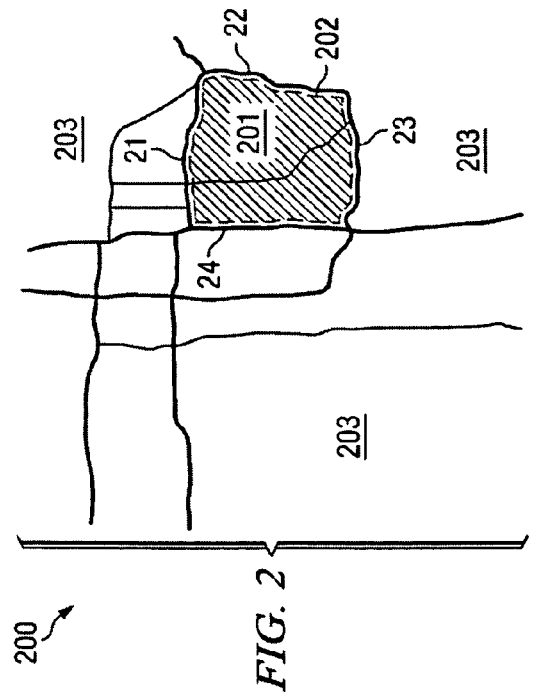
FIG. 2 illustrates a zone of interest for use in one embodiment of the invention.

FIG. 2 illustrates one embodiment of the invention in which a vehicle monitoring system uses different sets of monitoring criteria or thresholds in different locations. Map 200 represents a geographic area, such as, for example, a metropolitan area or city. Zone of interest 201 has been defined within the metropolitan area. Zone 201 is bounded by highways 21-24 in the example of FIG. 2. It will be understood that any geographic or other reference may be used to define a zone of interest, such as a state or interstate highway, main thoroughfare, side street, state/city/county line or other governmental boundary, building, parking lot, industrial complex, river, lake, shoreline, natural terrain feature, geographic coordinates (e.g. latitude/longitude), or the like. Zone of interest 201 is defined by boundary 202 in the illustrated example. Boundary 202 may be drawn as an overlay on map 200, for example, and may be represented by a series of points used to define segments of boundary line 202. Although only one zone of interest is illustrated in FIG. 2, it will be understood that any number of such zones may be defined for use with the present invention. Moreover, by defining zone of interest 201, area 203 also has been defined—i.e. as being outside of area 201.

In an embodiment of the invention, a vehicle monitoring system is configured to operate using a first set of parameters when a vehicle is within zone 201 and using a second set of parameters when the vehicle is in zone 203 (i.e. when it is outside of zone 201). The first parameters may define a restrictive set of operating criteria or thresholds to be used within zone 201, while the second set of parameters may define a "normal" set of operating criteria or thresholds to be used in other areas. For example, the vehicle may be a taxi or bus for which zone 201 is its assigned working area. The bus or taxi operating company may want to more strictly regulate, monitor or control vehicles within zone 201. Accordingly, the monitoring criteria and thresholds used within zone 201 may reflect that higher level of scrutiny. Within zone 201, the monitoring thresholds may be set to generate mentoring feedback or warnings to the driver if speeds in excess of a posted limit to any amount are detected. On the other hand, when operating outside of zone 201 (i.e. in area 203), the monitoring thresholds may allow for some excess speed, such as 10 MPH over posted speed limits, without generating mentoring feedback or a warning. In other embodiments, the monitoring criteria may provide a grace period to correct excess speeds outside zone 201, but require immediate correction within area 201.

In other embodiments, the operating parameters that are monitored may differ depending upon whether the vehicle is inside zone 201 or in zone 203. For example, if the monitored vehicle is a taxi or bus that is picking up passengers within zone 201, the monitoring system may be configured to record information associated with the passenger entry/exit from the vehicle. The monitoring system, upon detecting that it is within zone of interest 201, may be configured to record information each time a vehicle door is opened or each time the vehicle stops, such as recording video and/or audio of the passengers and driver or determining if a fare meter has started or stopped. When operating outside of zone 201, the monitoring system may be configured so that it does not record such information upon a vehicle door opening or at vehicle stops, if, for example, the vehicle is out-of-service or off duty when operating in area 203.

It will be understood that the present invention is not limited to the specific types of vehicles, geofences, or zones of interest that are used in the examples herein. The invention may be applied to vehicle monitoring systems in a large number of vehicles of different types. Geofenced areas or zones of interest may be defined around hospitals, schools, parks, or other public safety zones. A particular set of monitoring criteria may be established for these public safety zones so that drivers receive additional or more frequent mentoring feedback in these zones. For example, drivers in any type of vehicle may receive warnings immediately upon exceeding a posted speed limit while operating within these public safety zones, wherein their vehicle monitoring system may otherwise allow them some grace period when operating outside the public safety zones.

As noted above, a plurality of zones of interest, such as zone 201, may be created. A vehicle monitoring system may use a different set of criteria in each of the zones. Alternatively, the vehicle monitoring system may have a two or more predetermined sets of operating criteria and each zone may be linked to one or more of these sets of operating criteria. When the vehicle monitoring system determines that the vehicle has entered a new zone, it will then determine which set or sets of operating criteria or thresholds to apply in that zone.

Figure 3:
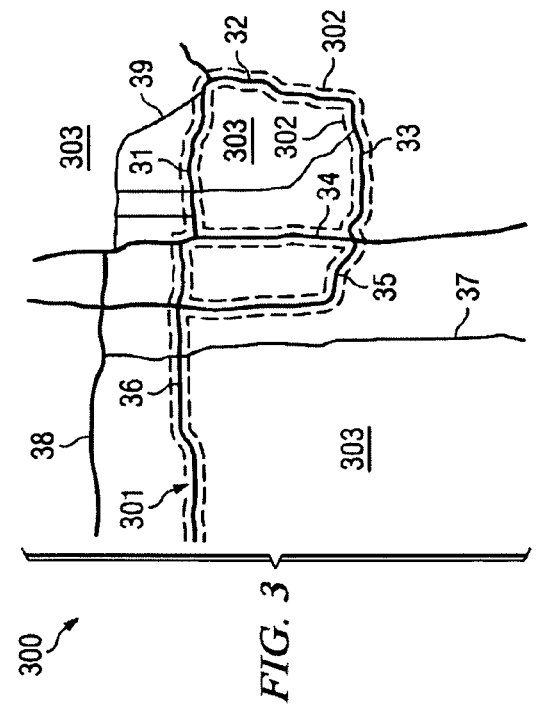
FIG. 3 illustrates another zone of interest for use in another embodiment of the invention.

FIG. 3 illustrates an alternative embodiment of the invention in which zone of interest 301 is defined on map 300 by boundary 302. Zone 301 includes roads 31-36 so that when a vehicle is operating on roads 31-36, the vehicle is considered to be in zone 301. The area outside of zone 301 is labeled as area 303. When the vehicle is operating on roads other than 31-36, such as when the vehicle is on roads 37-39, or is anywhere else outside of zone 301, the vehicle is in area 303. Zone 301 may represent, for example, an assigned or approved route. When the vehicle is operating in zone 301, such as on an assigned route, the vehicle monitoring system may use a first set of operating parameters. When the vehicle is operating in zone 303, or outside of zone 301, then the vehicle monitoring system may use a second set of operating parameters.

For example, a vehicle, such as a bus, street sweeper, garbage truck, or delivery truck, may be assigned to a particular route that is within zone 301. When the vehicle is on its route, a vehicle monitoring system may determine that it is within zone 301 using, for example, a current vehicle location from a GPS unit. While on the route and, therefore, within zone 301, the vehicle monitoring system will use an on-route set of vehicle monitoring parameters. In one embodiment, such on-route parameters may include specific requirements for vehicle speeds and accelerations, or limit or require the use of seatbelts, cellular telephones, turn signals, or other vehicle operations. When operating off of the assigned route and, therefore, outside of zone 301, the vehicle monitoring system may use a second set of parameters for zone 303. The second set of parameters may be more or less restrictive than the first set of parameters and/or may provide for monitoring of more or less parameters than the first set of parameters. For example, seatbelt use may be monitored in zone 301, but not in zone 303; and speed and acceleration criteria may generate mentoring feedback at lower thresholds in zone 301 than in zone 303.

It will be understood that multiple zones of interest or geofences for various routes may be used in addition to the single zone of interest or geofence illustrated in FIG. 3. Moreover, a single zone of interest or geofence may cover one or more routes or may cover partial routes. Additionally, a single route or partial route may be covered by one or more zones of interest or geofences. In other embodiments, zones of interest covering a route, such as zone 301, may be defined and used in the same system as zones of interest covering larger geographic areas, such as zone 201. For example, a vehicle monitoring system may have three sets of criteria, a first set for use inside zone 201, a second set for use in zone 301, and a third set for areas outside both zones 201 and 301. In the event that two geofences or zones of interest overlap in whole or in part so that a vehicle may be in an location that is linked to two different sets of monitoring parameters, criteria or thresholds, the vehicle monitoring system may be configured to select one set of monitoring parameters over the other. For example, referring to the zones illustrated in FIGS. 2 and 3, zone 301 overlaps zone 203 and, therefore, a vehicle monitoring system may have to select between criteria for zone 301 and criteria for zone 203. The vehicle monitoring system may be configured to select the more restrictive or the less restrictive monitoring parameters, criteria or thresholds. Alternatively, the vehicle monitoring system may be configured to select the group of monitoring parameters, criteria or thresholds that are established for the smaller zone or a more specifically defined zone, such as selecting criteria for zone 301 over criteria for zone 203.

Figure 4:
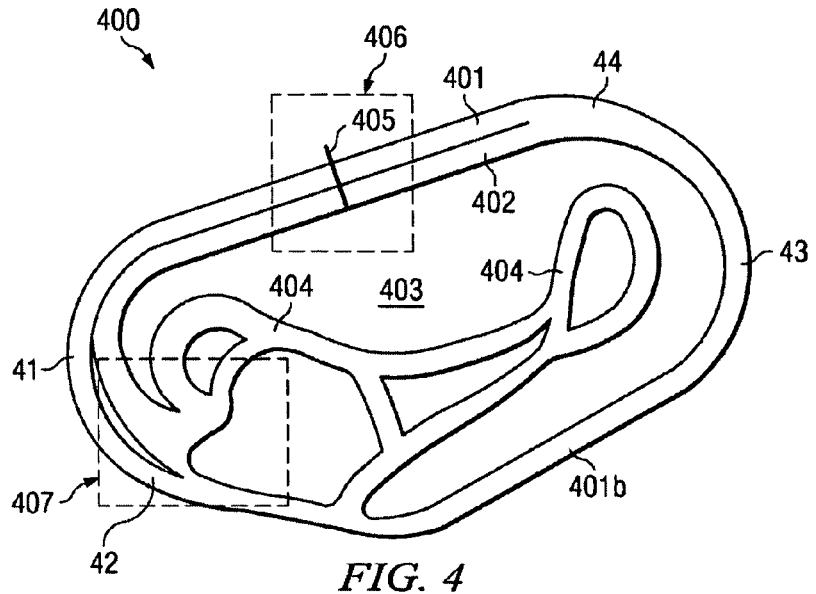
FIG. 4 illustrates an area incorporating embodiments of the present invention.

In other embodiments of the present invention, the vehicle monitoring system may be used in a racing or competitive environment. Speedway 400 is illustrated in FIG. 4 having racetrack 401 and pit road 402. Infield 403 may be grass or paved, such as infield roads 404 which allow support vehicles to move around the speedway without interfering with vehicles on the racetrack. Racetrack 401 includes four turns designated generally as 41-44. A start/finish line 405 is used to identify the start and finish point for races. Although speedway 400 illustrates a motor vehicle racetrack, such as Phoenix International Raceway, it will be understood that the present invention can be used on any speedway or racetrack, including, for example, any paved, grass, turf, dirt, man-made or natural course. The present invention can also be used on land, sea, or in the air (and space). Moreover, the present invention may be used with any vehicle or animal competitors, including, for example, cars, trucks, motorcycles, trains, planes, boats, bicycles, carts, horses, dogs, and humans. It will be further understood that the present invention, although illustrated by examples from a racing environment, is useable in any other competitive or non-competitive environment or any public, private or government enterprise or business and, therefore, should not be considered to be limited by the exemplary embodiments discussed herein.

As is well known, during a race the competitors begin at the starting line 405 and travel around racetrack 401 one or more times depending upon the length of racetrack 401 and the length of the race. Typically, the race is equated to a number of laps, such as a 200 mile race that requires 100 laps on a two-mile racetrack. Each time a competitor passes start/finish line 405, another lap is counted. As the race progresses, some competitors may fall behind by one or more laps and, as a result, the counting of laps for individual competitors may become more difficult as the race progresses.

Figure 5A:
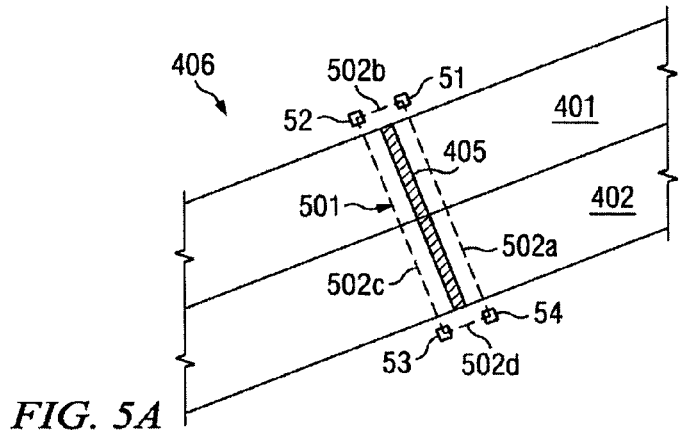
FIG. 5A illustrates a detailed area incorporating embodiments of the present invention.

FIG. 5A is a detailed illustration of portion 406 of speedway 400 near start/finish line 405. In one embodiment of the invention, geofence 501 is created around start/finish line 405. Geofence 501 is a polygon that may be created, for example, by designating a latitude and longitude for points 51-54, which are the vertices of the polygon having sides 502a-d. It will be understood that the size of geofence 501 may be matched exactly to the size of start/finish line 405 or may be larger or smaller than finish line 405 as desired. The monitoring system may be configured to record when competitors having a monitoring device pass though geofence 501. The number of times that a competitor passes through geofence 501 may be tracked and the data can be used to determine lap counts, lap split times, elapsed race times, average speed, trajectory, and other data. An in-vehicle monitoring system may track the number of laps and the associated times and/or this information may be forwarded to a central server or database, such as server 109 or database 110 in FIG. 1. A central server that collects lap count data from each competitor may provide centralized race information to users, such as via terminal 111 or a network or Internet connection. This information would allow a race authority to determine, how far and how many laps each competitor had traveled at any time and how much farther each competitor had to go. The data could be stored for historical analysis, such as average lap speeds or to review lap times and competitor order for each lap.

Figure 5B:
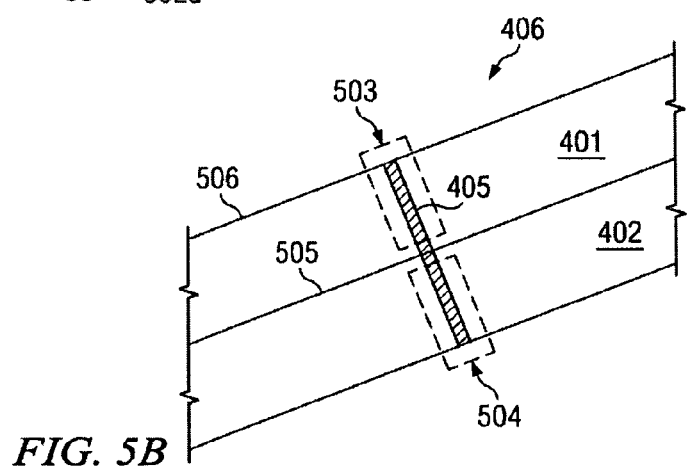
FIG. 5B illustrates a detailed area incorporating alternate embodiments of the present invention.

FIG. 5B illustrates an alternate embodiment in which start/finish line 405 is covered by two geofences 503 and 504, which may be creates in the same manner as geofence 501. By establishing two geofences 503 and 504 to cover start/finish line 405, the monitoring system would be able to determine and record whether the competitor had passed the finish line while on racetrack 401 or on pit road 402. This would allow the system to automatically count laps and to automatically determine when a competitor made a pit stop. It will be understood that geofence 501, 503 and 504 may be further divided as needed to provide additional information. For example, geofence 504 may be divided into multiple sections along start/finish line 405 between inside 505 and wall 506, which would provide additional information such as whether the competitor passed the start/finish line on the inside, middle or outside section of racetrack 401.

It will be further understood that in other embodiments, a geofence area such as 501, 503 and 504 may be established anywhere on racetrack 401, such as in turns 41-44 or on backstretch 401b (FIG. 4). This would allow for the automatic collection of additional data, such as partial lap split times, relative speeds between competitors, and relative order between competitors, for example. The present invention may also be used to designate specific areas on racetrack 401, pit road 402, infield 403, or infield road 404 to determine if a competitor ever passed over that area. For example, a geofence area could be established on the inside of a turn to determine if any, or to count how many, competitors used that line on racetrack 401. Additionally, geofence zones may be established for each competitor's pit area so that a central server was notified each time a competitor stopped in their pit.

Using embodiments of the present invention, wherein the start/finish line, pit areas, and other portions of the track are designated with geofences, each vehicle monitoring device could report to the central server when it passes through and/or stops in a geofence area. The location reports from the competitors' monitoring system may include an "in-zone" message upon entering the geofence area and an "out-of-zone" message upon leaving the geofence area. If the vehicle monitoring system sees these two events happen quickly, then it may transmit a location report of a transient event or with a combined in-zone and out-of-zone information.

Table 1 is illustrates exemplary vehicle reports for a track in which geofences have been set up at the start/finish line, halfway through each turn, in the middle of the backstretch, at the pit road start/finish line, and at each competitor's pit. The geofenced zones on the track have been further divided into three zones from the inside of the track to the wall to determine if the competitor passes each zone low on the inside, in the middle, or high on the wall. Each time a competitor enters, passes through, or stops in a geofenced zone, a report is sent to a central server with location information. Table 1 illustrates the type of messages that could be received by the central server from each competitor.

TABLE 1

| Competitor | Time | Report |
|---|---|---|
| 1 | 12:05:31 | Pass Pit Road Start/Finish Line |
| 2 | 12:05:33 | Pass Start/Finish Line - High |
| 1 | 12:05:33 | In Pit |
| 3 | 12:05:34 | Turn 4 - Middle |
| 2 | 12:05:37 | Turn 1 - Middle |
| 3 | 12:05:38 | Pass Start/Finish Line - Middle |
| 3 | 12:05:42 | Turn 1 - Low |
| 2 | 12:05:44 | Turn 2 - Middle |
| 2 | 12:05:48 | Backstretch - High |
| 3 | 12:05:50 | Turn 2 - High |
| 2 | 12:05:52 | Turn 3 - Middle |
| 1 | 12:05:54 | Out of Pit |
| 3 | 12:05:57 | Turn 3 - Middle |
| 2 | 12:05:58 | Turn 4 - Low |
| 1 | 12:05:01 | Turn 2 - Low |
| 3 | 12:05:01 | Backstretch - High |
| 2 | 12:05:02 | Pass Start/Finish Line - High |

Although the time shown in Table 1 is in hours: minutes: seconds, it will be understood that based upon the type of competition, further precision may be available, such as tenths, hundredths or thousandths of seconds at each point. Additionally, although only three competitors are shown in Table 1, it will be understood that the number of competitors that can be tracked the by present invention is unlimited.

Table 2 illustrates information available to a race authority based upon the geofence reports from the competitors. The information in Table 2 is available for as static information at specific times or may be dynamic information in which the display is updated with each competitor's location report. Cross referencing to the example above in Table 1, at time 12:05:50, a race authority could see the information illustrated in Table 2 based upon the competitors' most recent reports.

TABLE 2

| Competitor | Lap | Track Position | Elapsed Time | Elapsed Lap | Last Lap Time/ Speed | Average Lap Time/ Speed |
|---|---|---|---|---|---|---|
| 1 | 52 | Pit | 48.53 | — | 27.9/132 | 26.9/132 |
| 2 | 52 | Backstretch | 48.53 | 14.5 | 27.8/132 | 27.8/132 |
| 3 | 52 | Turn 2 | 48.53 | 12.1 | 28.5/133 | 27.5/132 |

Additional information may be included in the vehicle position reports, such as current speeds and accelerations as well as current engine parameters. This and other information may also be displayed in addition to or in place of the data in Table 2. Preferably, a database, such as database 110, coupled to the central server stores the received location reports for later recall and analysis. A race authority may select information of interest and configure a display, such as on terminal 111, so that the desired information is updated as it is received by the central server. Alternatively, the display may be updated at regular intervals, such as every 5, 10, 15 or 30 seconds depending upon the user's requirements. The information may also be made available to third parties, such as via an Internet website for free or by subscription so that race teams, the media, fans and other interested parties can access the information.

Figure 6:
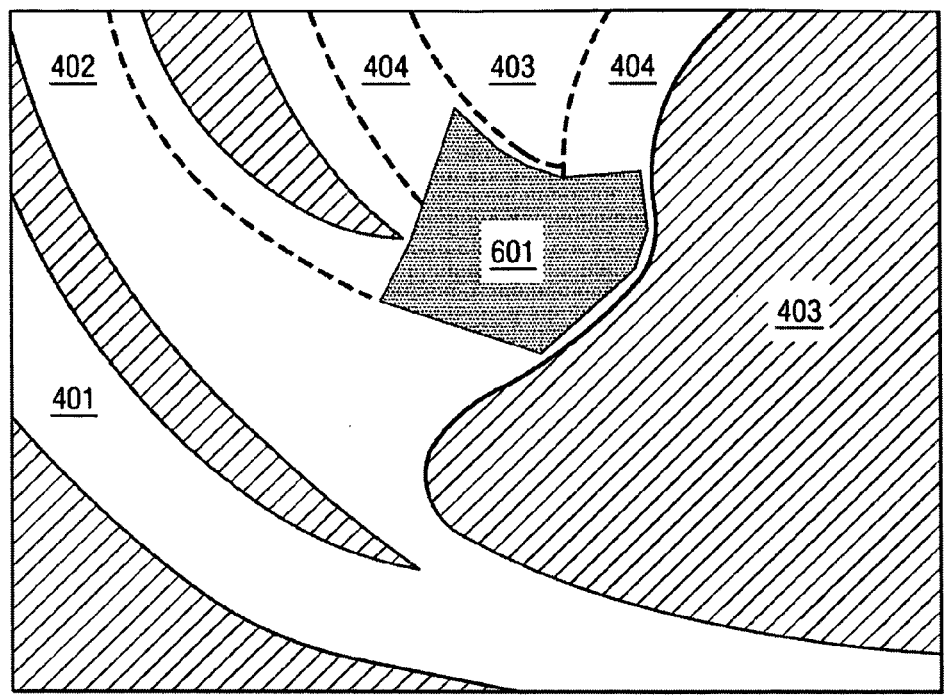
FIG. 6 illustrates a detailed area incorporating additional embodiments of the present invention.

In addition to the competitors, other vehicles, animals and/or people, use racetrack 401, pit road 402 and infield roads 404. For example, pace cars may be used to lead cars around racetrack 401 before the race begins or emergency vehicles, such as ambulances, fire trucks, or wreckers may enter racetrack 401 to assist following a vehicle crash. Before the race can begin or continue after a crash, for example, it is important that racetrack 401 is clear of all vehicles, animals and/or people other than the competitors. Emergency vehicle staging areas or safety areas are designated in infield 403 and, when the race is in progress, all emergency vehicles are required to be in their assigned staging area. FIG. 6 is a detailed illustration of portion 407 near turn 2 of speedway 400. Safety area or staging area 601 provides a location for emergency vehicles to park that is clear of racetrack 401 and pit road 402 while remaining close to racetrack 401 in the event of a crash. Other staging areas in infield 403 or near turns 41, 43, or 44 may also be used in other configurations.

Currently, in NASCAR race events, for example, spotters are assigned to watch emergency vehicles. The spotters are used to prevent a race from commencing or continuing while non-competitors are still on racetrack 401. Before the competitors can begin racing, as indicated by a "green flag," each spotter must visually confirm that his or her assigned emergency vehicle/s is/are within their assigned staging area, such as staging area 601, and report this information to a racetrack authority. Once all the spotters have reported that their assigned emergency vehicles are within the designated staging areas, the competitors are allowed to return to "green flag racing."

Figure 7:
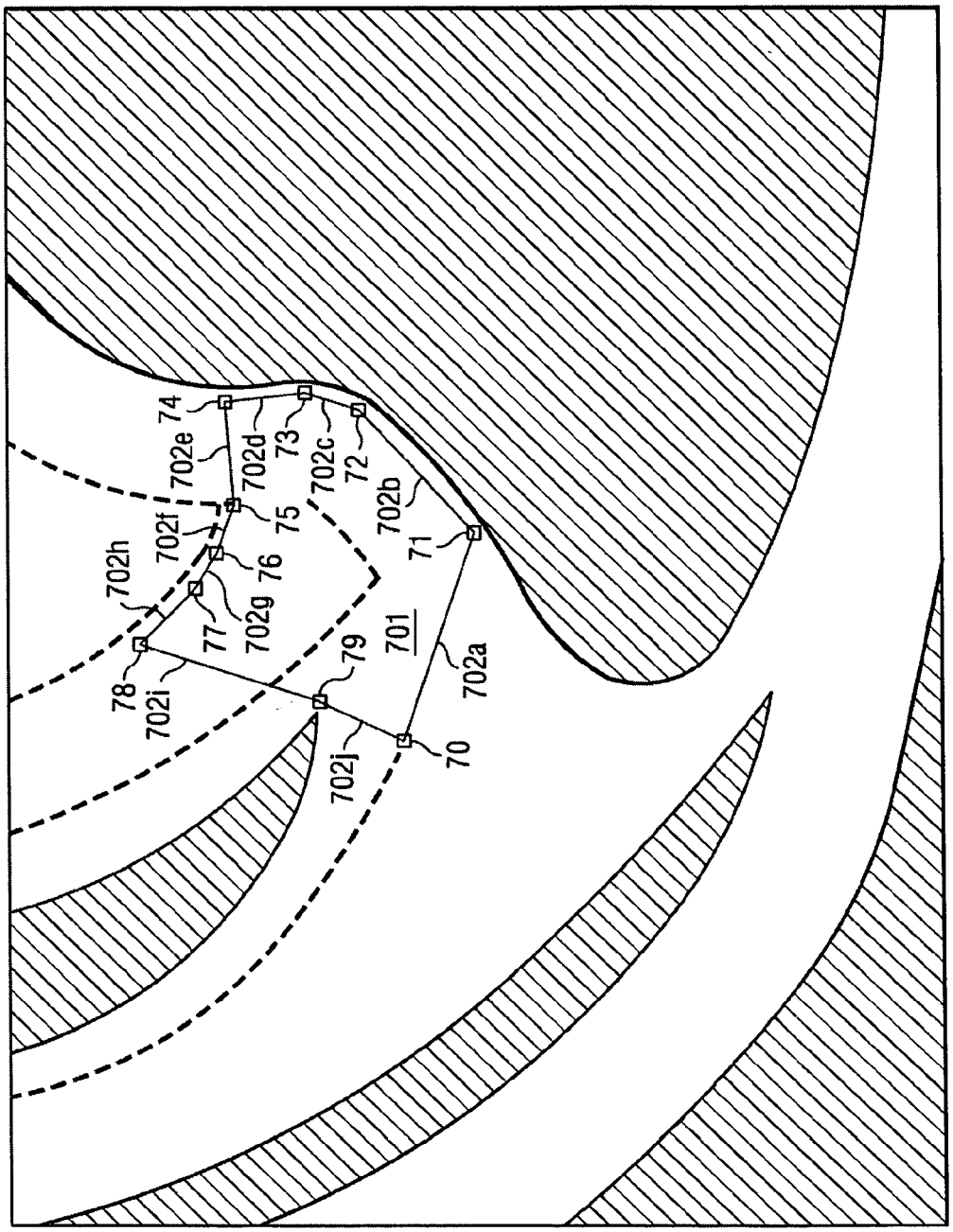
FIG. 7 illustrates a detailed area incorporating additional embodiments of the present invention.

FIG. 7 illustrates one embodiment of the invention in which geofence area 701 is defined to overlap staging area 601. Geofence area 701 is defined by segments 702a-702j that link vertices 70-79. Geofence area 701 may be formed using a drawing tool similar to the Microsoft®. Paint polygon tool in which point 70 is selected as an origin using a pointer such as a mouse. Segment 702a is drawing by dragging the pointer to a new location and clicking the pointer to fix the location of point 71. Segments 702b-702i are formed the same way by dragging the pointer and clicking at points 72-79. The number of points or nodes must be at least 3 (sufficient to define a region rather than a line). The geofence area is finished by dragging the pointer to point 70 and clicking or double-clicking to form segment 702j. The geofence area may be created, for example, as an overlay to a mapping program, such as Google™. Maps that allows the user to view a map of an area, or a satellite picture of the area, or a combination of both.

Figure 8:
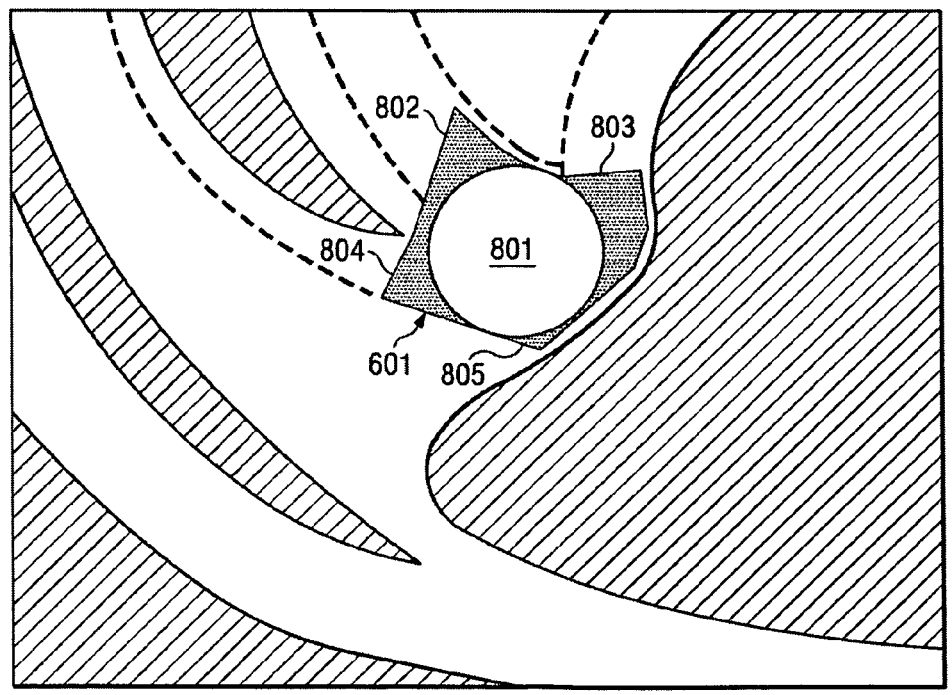
FIG. 8 illustrates a detailed area incorporating additional embodiments of the present invention.
Figure 9:
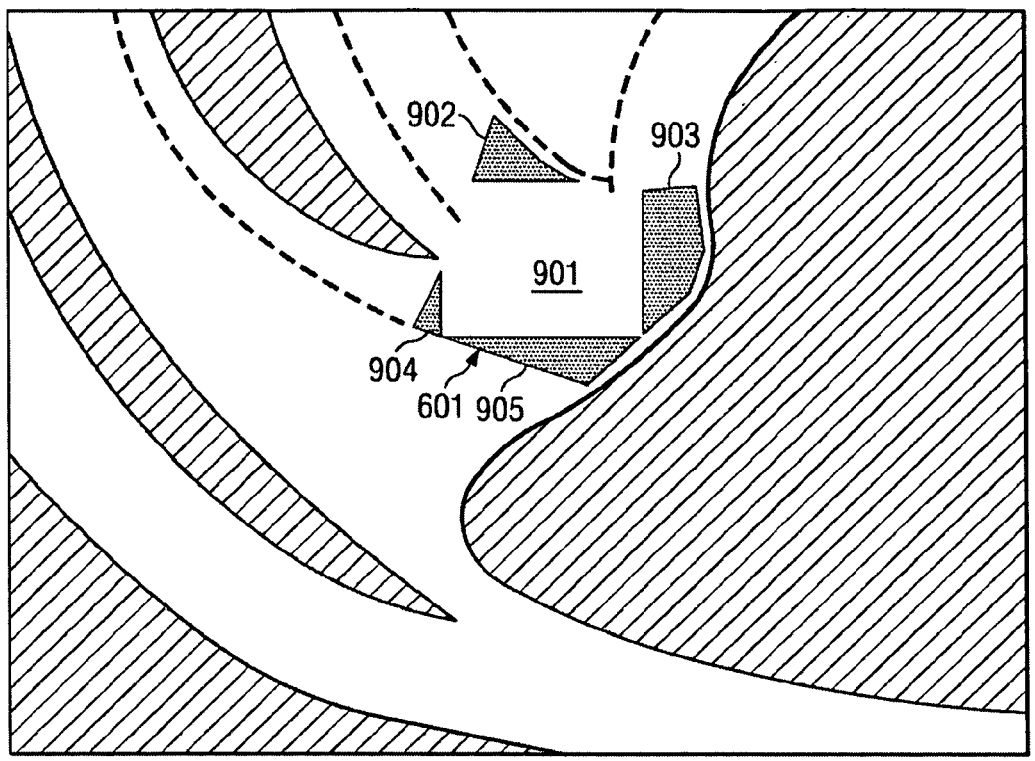
FIG. 9 illustrates a detailed area incorporating additional embodiments of the present invention.

FIG. 8 illustrates an alternative method for geofencing a staging area using a circular geofence 801. FIG. 9 illustrates another alternative method for geofencing a staging area using a rectangular geofence 901. As shown in FIGS. 8 and 9, using a standard circular or rectangular geofence does not allow one to accurately mark the desired geofence area for irregularly shaped areas. Areas 802-805 and 902-905, which are part of the desired staging area 601, are not adequately covered by the standard geofence techniques. Accordingly, it is preferred to use a geofence tool such as that illustrated in FIG. 7 wherein a multi-sided irregular polygon can be created to more accurately designate the desired area.

Table 3 illustrates one embodiment of the present invention, in which a track supervisor or race authority may determine whether each emergency vehicle, pace car, or other vehicle that may be authorized to be on the track during non-race conditions, such as under a "yellow flag" or caution. The vehicle monitoring system will report to the central server when the vehicle is in an assigned staging area. The central server will make that information available to users, for example, via a user terminal or a network or Internet connection. This allows a single individual to quickly determine if the racetrack is ready for the race to commence or continue. If, for example, vehicles 5 and 6, two wreckers, are still moving competitors off the racetrack following a crash and are not in their staging area, it will be quickly apparent from the emergency vehicle location report in Table 3. A vehicle that is out of the staging area may be designated as "not ready," "out of area" or by some other characterization.

TABLE 3

| Vehicle | Vehicle Type | Location |
|---|---|---|
| 1 | Supervisor | Staging Area 1 |
| 2 | Fire Truck | Staging Area 1 |
| 3 | Fire Truck | Staging Area 1 |
| 4 | Ambulance | Staging Area 1 |
| 5 | Wrecker | NOT READY |
| 6 | Wrecker | NOT READY |
| 7 | Fire Truck | Staging Area 2 |
| 8 | Fire Truck | Staging Area 2 |
| 9 | Ambulance | Staging Area 2 |
| 10 | Ambulance | Staging Area 2 |
| 11 | Wrecker | Staging Area 2 |
| 12 | Wrecker | Staging Area 2 |
| 13 | Pace Car | Staging Area 2 |

In an alternative embodiment, racetrack 401, infield 403, the pit area and other areas in the speedway may be designated by geofence areas. This would allow additional information to be presented to the user. For example, if the wreckers 5 and 6 were not in the staging area, instead of merely noting that these vehicles were not ready, the monitoring system may notify a track authority as to their actual location, such as "on racetrack," "in pit area," or "infield area."This additional information would allow the track authority to decide if the race should commence or continue. For example, a race would not resume with wreckers on the racetrack, but a restart may be acceptable if the vehicles were off the racetrack in the infield or pit area, but not yet in the staging area.

Figure 10:
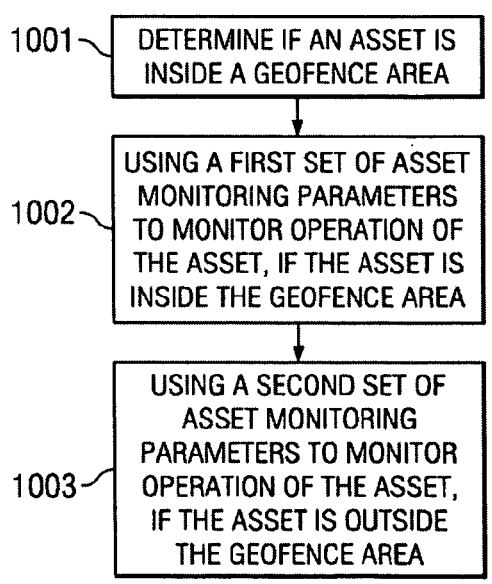
FIG. 10 is a flowchart illustrating one process for implementing the present invention.

FIG. 10 is a flowchart illustrating one process for implementing the invention. In step 1001, an asset monitoring system determines if the asset is within a geofence area. The asset may be a vehicle that is tracked using a vehicle monitoring system. In step 1002, if the asset within the geofence area, then a first set of asset monitoring parameters are used to monitor the operation of the asset. In step 1003, if the asset is outside the geofence area, then a second set of monitoring parameters are used to monitor operation of the asset. Multiple geofence areas may be created each with its own set of monitoring parameters so that the asset monitoring system operates different in each geofenced area.

Figure 11:
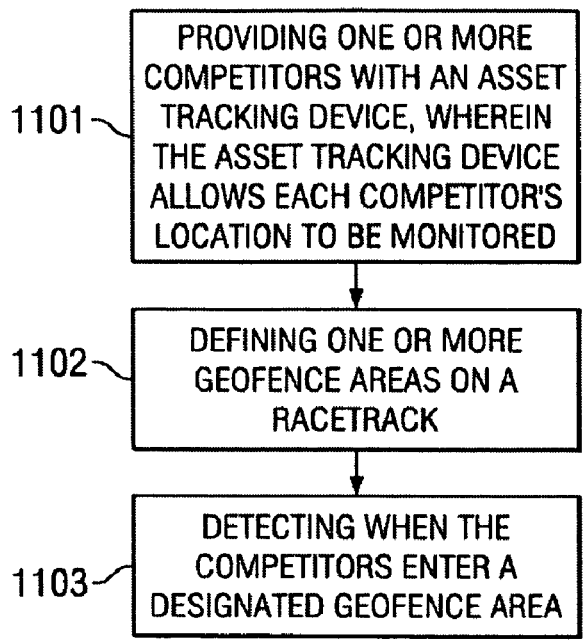
FIG. 11 is a flowchart illustrating another process for implementing the present invention.

FIG. 11 is flowchart illustrating an alternative embodiment of the invention. In step 1101, one or more competitors are provided with an asset tracking device. The asset tracking device allows the location of each competitor to be monitored. In step 1102, one or more geofence areas on a racetrack are defined. In step 1103, it is determined whether the competitor has entered one of the geofenced areas.

Figure 12:
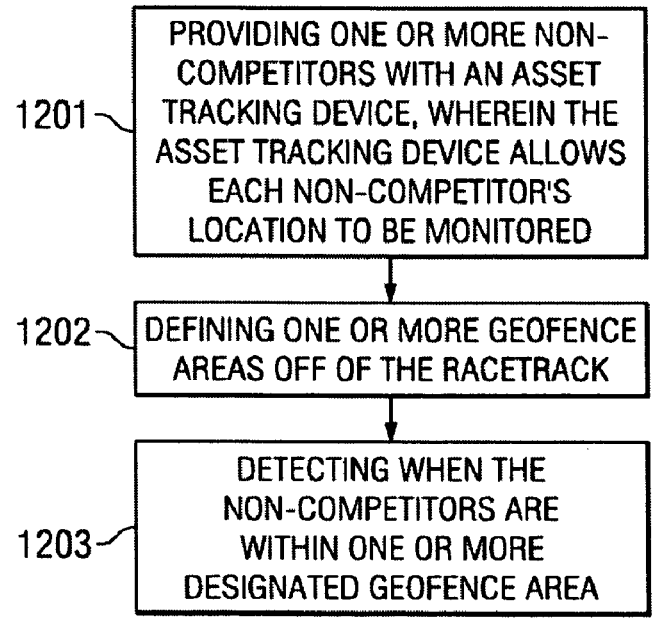
FIG. 12 is a flowchart illustrating another process for implementing the present invention.

FIG. 12 is a flowchart illustrating another embodiment of the invention. In step 1201 one or more non-competitors are provided with an asset tracking device. The asset tracking device allows the location of the non-competitor to be monitored. In step 1202, one or more geofence areas are defined off of a racetrack. In step 1203, it is determined whether the non-competitors are within the one or more off-track geofence areas.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for tracking assets, comprising:
   determining if an asset is inside a defined zone;
   using a first set of asset monitoring parameters to monitor operation of the asset, if the asset is inside the defined zone, wherein the first set of asset monitoring parameters comprises a first threshold associated with a first monitoring parameter and the inside of the defined zone; and
   using a second set of asset monitoring parameters to monitor operation of the asset, if the asset is outside the defined zone, wherein the second set of asset monitoring parameters comprises a second threshold associated with the first monitoring parameter and the outside of the defined zone.

2. The method of claim 1, wherein the asset is a vehicle.

3. The method of claim 2, wherein the operation of the vehicle is monitored using a vehicle monitoring system that provides mentoring feedback to a driver.

4. The method of claim 2, wherein the vehicle is monitored using a vehicle monitoring system capable of detecting the vehicle's speed, and wherein the vehicle monitoring system uses a first set of speed parameters, if the vehicle is inside the defined zone; and the vehicle monitoring system uses a second set of speed parameters, if the vehicle is outside the defined zone.

5. The method of claim 4, wherein the first and second sets of speed parameters are used to provide feedback to the driver upon detection of a speeding condition.

6. The method of claim 4, wherein the first and second sets of speed parameters are used to trigger messages to a third-party upon detection of a speeding condition.

7. The method of claim 2, wherein the vehicle is monitored using a vehicle monitoring system capable of detecting acceleration forces acting on the vehicle, and
   wherein the vehicle monitoring system uses a first set of acceleration parameters, if the vehicle is inside the defined zone; and the vehicle monitoring system uses a second set of acceleration parameters, if the vehicle is outside the defined zone.

8. The method of claim 7, wherein the first and second sets of acceleration parameters are used to provide feedback to the driver based upon vehicle acceleration measurements.

9. The method of claim 7, wherein the first and second sets of acceleration parameters are used to trigger messages to a supervisor or parent based upon vehicle acceleration measurements.

10. The method of claim 1, wherein the defined zone has a multi-sided shape defined by a geographic region.

11. The method of claim 1, wherein the defined zone has a circular shape defined by a radius around a selected point.

12. The method of claim 1, further comprising:
defining the defined zone by drawing an irregular polygon, wherein the irregular polygon is drawn by sequentially designating locations of vertices of the irregular polygon.

13. The method of claim 12, wherein the irregular polygon is drawn over a map and the locations of the vertices are selected from points on the map.

* * * * *